United States Patent Office 2,882,310
Patented Apr. 14, 1959

2,882,310

PRODUCTION OF ORGANIC PHOSPHONYL HALIDE

John W. Copenhaver, Short Hills, and Jack Kwiatek, North Arlington, N.J., assignors to The M. W. Kellogg Company, Jersey City, N.J., a corporation of Delaware No Drawing. Application June 28, 1954
Serial No. 439,857

12 Claims. (Cl. 260—543)

The present invention relates to an improved process for the production of organic phosphonyl halides and derivatives derived therefrom. In one aspect this invention relates to an improved process for the production of the alkyl phosphonyl halides including both the alicyclic and acyclic phosphonyl halides. In another more particular aspect this invention relates to the production of methane phosphonyl dichloride.

The organic phosphonyl halides and especially methane phosphonyl dichloride are much in demand as intermediate chemical reactants for the production of more complex organic phosphorus-containing compounds, such as the corresponding esters, free acids and amides by conventional methods, which are useful as fungicides, insecticides, and pharmaceuticals. Because of their great chemical stability the alkane phosphonic acids and esters in particular are valuable not only for these uses but are also useful in other technological applications, for example, as plasticizers, flameproofing agents for textiles, petroleum additives to improve the stability and quality of lubricating oils, water repellents, and antioxidants and polymer additives.

In general the conventional techniques for preparing the organic phosphonyl halides on a commercial scale employ staring materials which already contain the C–P bond, such materials in themselves being produced by reactions involving devious and round-about methods. Less involved methods for the production of the organic phosphonyl dihalides in particular are not applicable to the production of the lower molecular weight analogs, for example, in good yield. The more common of these less involved methods involve reactions between a hydrocarbon, a phosphorus trichloride, and oxygen. Although comparatively higher molecular weight alkanes, such as n-heptane, react with phosphorus trichloride and oxygen to produce the corresponding alkane phosphonyl dichloride in good yield, methan reacts with phosphorus trichloride and oxygen to produce methane phosphonyl dichloride in extremely poor yield. Thus, such a process for manufacturing methane phosphonyl dichloride, for example, is commercially impracticable.

An object of this invention is to provide a process for producing organic phosphonyl halides in improved yields and selectivity.

Another object of this invention is to provide a method for producing organic phosphonyl halides with the maximum utilization of reactants and by-products.

A further object is to obtain higher yields of organic phosphonyl halides by minimizing the amount of residual by-products by converting the latter to organic phosphonyl halides.

A still further object is to provide an improved process for the production of organic phosphonyl halides under conditions such that additional products are obtained from difficultly distillable solids formed during the process.

A still further object is to produce the lower molecular weight organic phosphonyl halides, such as methane phosphonyl halides, in substantially greater yields than are obtained by present methods.

Various other objects and advantages of the present invention will become apparent to those skilled in the art from the accompanying description and disclosure.

It has now been found that additional amounts of organic phosphonyl halides may be recovered from difficultly distillable solid products by subjecting to halogenation the difficultly distillable solid by-products produced during the course of the reaction between a phosphorus trihalide with an organic compound of the formula RO—Y in which R is an organic radical, preferably an alkyl or aralkyl group having not more than 12 carbon atoms, and Y is a radical containing an organic group, or a dihalo phosphorus group, such as in an organic ether, acetal, ketal, and ester, or in an alkoxy dihalophosphine. The halogenation of the solid residue is effected with a suitable halogenating agent. The halogenation is effected during the reaction proper, or in a separate step after the reaction proper has ceased, such as by separating the solid residue from the product mixture and subjecting this solid residue to halogenation, e.g., chlorination or fluorination.

The organic phosphonyl halides produced in accordance with this invention have the general formula

$$R-\overset{O}{\underset{\|}{P}}-X_2$$

where R is an organic radical and X is any of the halogens (Br, Cl, I, F) and the X's may be the same or different halogen atoms. The R of the organic phosphonyl halides produced is derived from various organic reactants which contain organic radicals linked to oxygen, the organic radicals being free of olefinic unsaturation and selected from the group consisting of the acyclic and alicyclic alkyl radicals including the substituted acyclic radicals, in which one or more hydrogen atoms is substituted with the corresponding number of groups selected from the group consisting of the halo, nitro, cyano, aryl, and sulfone groups and preferably having not more than about 12 carbon atoms arranged in a continuous carbon skeleton, the substituents being hydrogen or any of the above substituents.

The various reactions described herein for the production of organic phosphonyl halides lead to the formation of normally solid compounds which are difficultly distillable, and in certain of these reactions the build-up of solid is quite large. The important thing about these residues, or solids, is that they can be made to yield additional amounts of organic phosphonyl halide product thereby minimizing the amount of residual by-product, and leading to a higher total yield of product.

Many of the well known types of halogenating agents may be employed to halogenate these undistillable solids, the particular halogenating agent depending upon whether chlorination, bromination, iodination or fluorination is desired. More specifically, the suitable halogenating reagents to be used in accordance with this invention are those in which the halogen is linked to a halogen carrier as in the phosphorus pentahalides, such as phosphorus pentafluoride, phosphorus pentachloride, phosphorus pentaiodide and phosphorus pentabromide; the halides of the oxides of sulfur, such as thionyl chloride, thionyl iodide, sulfuryl chloride and sulfuryl bromide; metallic halides, such as antimony pentachloride, antimony pentafluoride, cobalt trifluoride, etc.; wherein the halogen carriers are phosphorus, oxides of sulfur and metals, respectively. The selection of a specific halogenating reagent will depend upon the nature of the halogen atoms linked to the phosphorus atom of the organic phosphonyl halide product formed in the initial stage of the process. Thus it is preferred to have the halogenating agent correspond to halide of the product produced directly by the process. For example, when producing an organic phosphonyl dichloride by the reaction between phosphorus trichloride and an organic-containing reactant, it is preferable to treat the solids with a chlorinating reagent such as phosphorus pentachloride or thionyl chloride in order to avoid the formation of mixed halide products. When the solids are to be chlorinated or brominated, phosphorus and the oxides of sulfur have been found to be the more preferable of the halogen carriers. However, if mixed products are desired, the halogenating agent will differ from the halide of the product of the primary reaction.

In the process comprising reaction between a phosphorus trihalide ($PX_3$) and a compound having the general formula RO—Y, an organic phosphonyl dihalide $$(R-\overset{O}{\underset{\|}{P}}X_2)$$

is produced as the product together with a solid residue as a by-product, the solid residue or bottom yielding additional amounts of product when subjected to halogenation as described herein. The reactant, RO—Y, serving as a source of the organic radical found in the organic phosphonyl dihalide product comprises the organic radical, R, linked to the oxygen by a carbon to oxygen bond, the nature of R in RO—Y being the same as that previously defined for the R group found in the final product, $$R-\overset{O}{\underset{\|}{P}}X_2$$

and Y, which is a dihalo phosphorus group or a radical containing an organic group, R'. The organic radical R' is free of olefinic unsaturation and is selected from the group consisting of the acyclic and alicyclic alkyl radicals including the substituted acyclic alkyl radicals in which one or more hydrogen atoms is substituted by a radical selected from the group consisting of the halo, nitro, cyano, aryl, alkoxy, and sulfone groups and a doubly bonded oxygen atom. Preferably R' has not more than 12 carbon atoms arranged in a continuous carbon skeleton, the substituents being hydrogen or any of the above substituents.

The various types of RO—Y reactants used in accordance with this invention are differentiated on the basis of the nature of the linkage between RO— and Y. When Y is equivalent to the organic radical, R', then RO— is linked to R' by a carbon to oxygen bond, such as in the organic ethers, organic acetals, organic ketals and esters of organic acids. The organic ethers which are used in accordance with the basic primary reaction of the improved process described herein include the symmetrical and unsymmetrical ethers, such as dimethyl ether, dibenzyl ether, beta, beta'-oxydiproprionitrile, cyclohexyl methyl ether, 2-nitropropyl methyl ether and beta-chloroethyl ethyl ether. The organic acetals which are used are those derived from an aldehyde and an aliphatic alcohol as exemplified by dimethyl formal and diethyl benzal. The organic ketals which are used are those derived from a ketone and an aliphatic alcohol as exemplified by the dimethyl ketal of acetone and the diethyl ketal of cyclohexanone. The mono, poly and ortho esters of organic acids which are suitable RO—Y reactants are as follows: methyl formate, benzyl acetate, dimethyl adipate, trimethyl ortho formate and triethyl ortho benzoate.

When Y is linked to RO— by a bond between the oxygen and an atom of phosphorus, sulfur or boron, the phosphorus, sulfur or boron being further linked to oxygen and an R'O— group where R' is as defined previously, the RO—Y reactant is a poly ester of an inorganic acid as typically represented by dimethyl sulfate, dibutyl borate and triethyl phosphate.

When Y of the RO—Y reactant is a dihalophosphorus group ($-PX_2$), then the reactant is an alkoxy dihalophosphine, the preferred types being exemplified by methoxy dichlorophosphine, ethoxy dibromophosphine and isopropoxy dichlorophosphine.

In all of the reactions described herein and resulting in the formation of organic phosphonyl dihalides together with difficultly distillable solid residues a phosphorus trihalide of the type $PX_3$ is employed, the selection of a specific $PX_3$ compound depending upon the halogen atoms desired in the final product. Typical examples of suitable phosphorus trihalides are: phosphorus trifluoride, phosphorus trichloride, phosphorus tribromide and difluorophosphorus iodide.

A typical equation representing the basic reaction involved in the formation of the solid residues which are halogenated to yield additional yields of organic phosphonyl dihalides in accordance with this invention is as follows:

(1)
$$RO-Y + PX_3 \longrightarrow R-\overset{O}{\underset{\|}{P}}X_2 + YX + \text{solid residue}$$

where R, and Y are as described previously and X is any of the halogens (Br, Cl, I, F) and the X's may be the same or different.

In the process illustrated by Equation 1, it has been found that increased yields are obtained by employing additional reactants, such as organic halides, formaldehyde and compounds containing a phosphoryl group. Typical examples of the substituted and unsubstituted hydrocarbon halides which are useful to increase the yield of organic phosphonyl halides are as follows: methyl chloride, ethyl bromide, trichlorocyanopropane, nitro trichloromethane, bromobenzodichloride, benzyl iodide, decyl chloride, hexachlorocyclohexane, and phenyl beta-chloroethyl sulfone. Aromatic halides are also employed but are limited to those in which the halogen atom is activated by the presence of a nitro group with preferably at least two nitro groups in the ortho and para positions of the aromatic ring, such as in 2,4-dinitrochlorobenzene.

When formaldehyde is used as an additional reactant, it is added to the reaction zone in the form of one of its polymers, such as trioxane and paraformaldehyde. This process is described in more detail in copending application S.N. 439,859 in the name of Jack Kwiatek filed concurrently herewith to which reference may be had for greater detail as to the process and product.

Of the compounds containing a phosphoryl group which have been found to enhance the yield of product obtained by the reaction of Equation 1 typical examples of the preferred type are: phosphoryl trichloride, chlorophosphoryl dibromide, and fluorophosphoryl dibromide.

Further details of these particularly improved processes for the production of organic phosphonyl halides in enhanced yields by the reaction between phosphorus trihalide and an organic ether in the presence of an organic halide, with or without the addition of a compound containing a phosphoryl group, are to be found in prior and copending application S.N. 389,505, filed October 30, 1953, in the name of Jack Kwiatek.

The various reactions referred to above for the formation of the difficulty distillable solid residues are operative at a temperature between that of room temperature (20° C.) and the decomposition temperature of the reactants. Generally the temperature of the reaction will be below about 350° C. The reaction may be effected at elevated temperatures by introducing the individual reactants, either separately or together, into a reaction zone, such as a steel bomb, and carrying out the reaction under autogenous conditions of pressure as a matter of convenience. However, superimposed pressures up to about 1100 pounds per square inch gage may be employed without departing from the scope of this invention. The preferred temperature range is between about 150° C. and about 300° C. The time of reaction may vary over relatively wide limits, such as between about 10 minutes and about 20 hours, but the preferable contact time, or residence time, has been found to be between about 1 and about 15 hours.

In general, the mole ratio of any one of the above mentioned reactants with reference to the number of moles of phosphorus trihalide employed may vary over relatively wide limits, such as from about 0.1 to 2 and preferably from about 0.2 to 1.

Further details concerning various catalysts employed to effect the production of organic phosphonyl dihalides in good yield and details for the separation and purification of the products are to be found in the previously mentioned copending applications and in prior and copending application S.N. 389,504, filed October 30, 1953, also in the name of Jack Kwiatek, as inventor.

The halogenation step which leads to additional yields of product in accordance with this invention can be conducted in various ways. For example, upon completion of the reaction during which the solid by-product is formed, the halogenating reagent may be added to the total crude reaction mixture containing the organic phosphonyl halide product, solid bottoms, small amounts of other by-products and unreacted starting materials without first separating the product or other materials. Alternatively, upon completion of the reactions during which the solids are formed, the product, unreacted reactants, and distillable by-products are separated from the crude reaction mixture by conventional techniques, such as by decantation or distillation, leaving the solid residues for the halogenation stage of the process.

In either procedure the halogenation is conducted at atmospheric pressure, or superimposed pressures up to about 1100 pounds per square inch gage, or under autogeneous conditions of pressure without departing from the scope of this invention. The halogenation is conducted at a temperature between that of room temperature (20° C.) and the decomposition temperature of the reactants. Generally, the temperature of the reaction is below about 350° C. When conducting the halogenation at atmospheric pressure, the halogenating reagent is added and in order to hasten the completion of the halogenation, the mixture is heated to reflux temperature and refluxed for a period of time which will depend upon the amount of undistillable solid formed during the initial phase of the reaction. In general, the period of reflux will be between about ½ hour and about 15 hours, but the period of reflux is not critical to the success of the halogenation of the solids to yield additional amounts of phosphonyl halide. When conducting the halogenation at superatmospheric pressures, the halogenation is conducted of necessity in a closed reaction vessel, such as a steel pressure bomb. The preferred temperature range for operation at high pressures is between about 150° C. and about 300° C. and the time of reaction may vary over relatively wide limits, such as between about 10 minutes and about 20 hours, the preferable contact time has been found to be between about 1 and about 15 hours.

When halogenating the solid by-products, the amount of halogenating reagent must be kept at a minimum in order to avoid possible halogenation of the organic radical linked to the phosphorus atom of the phosphonyl halide which was formed during the first stage of the process or which is formed directly from the solid as the latter is halogenated. It is postulated without limiting the scope of the invention, however, that the solids contain pyrophosphonate linkages and have the general structure:

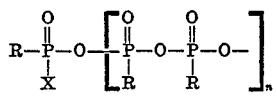

where R is an organic radical as defined previously and X is a halogen and $n$ is an integer from 4 to 20. It has been found that under the conditions described herein the halogenating reagent attacks the phosphorus to oxygen bonds, —P—O—P—, to yield phosphorus to halogen bonds, —P—X, in preference to attack on the organic radicals (R) linked to the phosphorus atoms.

Only enough halogenated reagent is added to effect cleavage of the —P—O—P— bonds, excessive amounts being avoided for the reason already stated, namely, to avoid halogenation of the R groups. The amount of halogenating reagent added to the crude reaction mixture or to the solid will be determined by the amount of product formed during the first stage of the reaction. When about 10 to 60 percent of organic phosphonyl halide is produced during the initial stage of the process, and when employing a highly halogenated reagent, such as phosphorus pentachloride, for example, the halogenating reagent should be added in an amount between about 0.1 to about 0.8 of the molar amount of phosphorus trihalide added originally. When between about 10 and 60 percent of organic phosphonyl halide is produced during the initial stage of the process and when employing the less highly halogenated reagents, such as thionyl chloride, for example, then such a halogen carrier is added in an amount between about 0.5 to twice as much as the molar amount of phosphorus trihalide employed in the first step. It is to be stressed that these molar ratios are not to be construed as limiting, and that amounts of halogen carrier above and below these limits may be used depending upon the variables mentioned previously.

If desired, the halogenation may be carried out in the presence of various liquid solvents and diluents which are inert to attack by the halogenation reagent, although the use of such diluents is not necessary to the successful operation of the invention. Suitable solvents and diluents are phosphorus trichloride, carbon tetrachloride, aliphatics, such as hexane and cyclohexane, aromatics, such as chlorobenzene, bromobenzene, benzene, etc. The use of a solvent is particularly desirable when halogenating the solids after they have been separated from the crude reaction mixture. The selection of solvent or diluent may also depend upon the temperature of reflux desired. The amount of diluent used is usually between about 25 and about 75 volume percent of the total mixture.

Solid by-products are also formed during the reaction between organic trivalent phosphorus halides, such as phenyl phosphorus dichloride and the various organic reactants discussed previously. These solids are not of the polymer type as are the pyrophosphonate structures postulated as being formed by reaction between a phosphorus trihalide and the various organic reactants. Instead they are postulated as being dimers of the type:

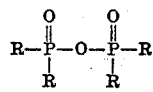

and depending upon the nature of the organic groups linked to phosphorus they may be distilled. However, additional product

is recovered from these solids by the same treatment with a halogenating reagent as described herein for halogenation of the pyrophosphonate type structures, whereby the —P—O—P— are converted to —PX bonds.

Upon completion of the halogenation reactions the total mixture is subjected to distillation in order to separate the organic phosphonyl halide product, the latter being further purified by fractional distillation or crystallization depending upon the physical nature of the product. The organic phosphonyl halides may be isolated as such or they may be hydrolyzed to the corresponding phosphonic acids, which then may be converted to various ester derivatives, or the phosphonyl halides may be converted directly to a desired type ester by conventional methods. The products are identified by the usual methods, such as determination of boiling point and other such physical properties, determination of infrared absorption spectra, percent composition analysis, mass spectrometer analysis, etc.

The following examples are offered as a better understanding of the present invention and illustrate that additional yields of organic phosphonyl halides are obtained by treatment of undistillable by-products with a halogenation reagent as described herein, but the examples are not to be construed as unnecessarily limiting to the present invention.

Example 1

A 200 ml. steel pressure bomb was charged with 106 ml. (1.2 moles) of phosphorus trichloride, 30.4 grams (0.4 mole) of dimethyl formal and 62.5 grams (0.2 mole) of nickel iodide. The bomb was then closed, placed in a reciprocating shaker, heated to 250° C. and held at this temperature for a period of 7.0 hours until the reaction had substantially ceased. The bomb was then cooled and vented to atmospheric pressure. The total crude product (236.1 grams) in the bomb was transferred to a distilling flask and distilled at atmospheric pressure to obtain 103 grams of a liquid as overhead product. The 123.8 grams of solid residue was recovered, analyzed and treated with thionyl chloride as reported below in Example 2.

The 103 grams of liquid was distilled at atmospheric pressure to yield the following liquid fractions: (1) 23.3 grams boiling at 62°–90° C., and (2) 71.8 grams boiling at 90°–205° C. The second fraction was diluted with purified chloroform, shaken with mercury to remove iodine, filtered to remove the mercury salts, and redistilled at atmospheric pressure. The following fractions were obtained: (1) 60°–64° C., (2) 64°–90° C., (3) 90°–155° C., and (4) 155°–164° C. The weight of fraction (4) represented a 45% yield of methane phosphonyl dichloride, calculated on the basis of dimethyl formal.

Example 2

Analysis of the 123.8 grams of solid residue obtained by the method of Example 1 revealed that it contained 10.70% phosphorus, 35.92% chlorine, and 2.50% iodine. This solid residue was placed in a 200 ml. steel pressure bomb along with 109 ml. (1.5 moles) of thionyl chloride. The bomb was closed, placed in a reciprocating shaker, heated to 250° C. and held at this temperature for a period of 7 hours. The bomb was then cooled and vented to atmospheric pressure. The total crude product (226 grams) in the bomb was transferred to a distilling flask and heated at atmospheric pressure to obtain 32 grams of a liquid which was distilled overhead at atmospheric pressure. A liquid fraction boiling between 120° and 200° C. was collected and freed of iodine by treatment with chloroform and mercury, as described in Example 1. The purified liquid was distilled further to yield a higher boiling fraction, which has a boiling point of 150°–163° C. This fraction was found to contain 11.6 grams of methane phosphonyl dichloride which represents a 22% yield of product, basis being the original quantity of dimethyl formal. Thus, the total yield of methane phosphonyl dichloride obtained in Examples 1 and 2 is 67%.

Example 3

A 200 ml. steel pressure bomb was charged with 106 ml. (1.2 moles) of phosphorus trichloride, 30.4 grams (0.4 mole) of dimethyl formal and 62.5 grams (0.2 mole) of nickel iodide. The bomb was then closed, placed in a reciprocating shaker, heated to 250° C. and held at this temperature for a period of 4 hours. The bomb was then cooled and vented to atmospheric pressure. The contents, including 230.9 grams of solid, from the bomb was transferred to a flask fitted with a reflux condenser and 91 ml. (1 mole) of phosphorus trichloride (used as diluent) and 40.2 grams (0.2 mole) of phosphorus pentachloride were added. The total mixture was refluxed for a period of 5½ hours with a bottoms temperature of about 75° to 100° C. and then distilled to yield two fractions: (1) 75°–90° C., and (2) 90°–226° C. The second fraction was freed of iodine, as described in Example 1 and the purified fraction distilled at atmospheric pressure to yield a main fraction boiling at 150°–165° C. and weighing 36.4 grams. Thus a 68% yield (basis, dimethyl formal) of methane phosphonyl dichloride was obtained by this procedure as compared with the 45% yield of product obtained by the method of Example 1.

The halogenation may also be carried out during the reaction proper by introducing a halogenating agent into the reaction zone together with the other reactants as illustrated in the following Example 4. However, in this type of operation care must be taken not to use a strong halogenating agent in order to avoid halogenating the organic radical of the product. The preferred method is therefore to complete the reaction, separate the solid residue and separately halogenate the solid residue and then recombine the product.

Example 4

To a flask charged with 79 ml. (0.9 mole) of phosphorus trichloride, 13.3 grams (0.26 mole) of methyl chloride, 62.5 grams (0.3 mole) of phosphorus pentachloride and 46.9 grams (0.15 mole) of nickel iodide, was added dropwise 23.3 grams (0.3 mole) of dimethyl formal. During this addition methyl chloride was liberated, collected, and measured. Methyl chloride equivalent to that liberated, namely, 13.3 grams (0.26 mole), was added back to the liquid mixture and the total mixture charged to a 200 ml. steel pressure bomb. The bomb was closed, placed in a reciprocating shaker, heated to 250° C. and held at this temperature for a period of 4 hours. The bomb was then cooled and vented to atmospheric pressure. The total crude product (181.4 grams) in the bomb was transferred to a distilling flask and upon heating 93.3 grams of a liquid was obtained which when distilled at atmospheric pressure yielded two fractions boiling at: (1) 70°–90° C., and (2) 90°–209° C. The second fraction was freed of iodine as described in Example 1, and distilled to yield 25.4 grams of a fraction boiling between 150° C. and 165° C. representing a 61% yield (basis dimethyl formal) of slightly impure methane phosphonyl dichloride which upon further purification yielded a pale yellow liquid and white crystals of methane phosphonyl dichloride.

Various modifications and alterations of the invention may become apparent to those skilled in the art without departing from the scope of this invention.

Having described our invention, we claim:

1. A process which comprises halogenation with a halgenating agent selected from the group consisting of a phosphorus pentahalide, a halide of an oxide of sulfur, antimony pentafluoride, antimony pentachloride and cobalt trifluoride, of a difficultly distillable solid residue obtained as a by-product in the reaction between a phosphorus trihalide and a compound having the formula R—O—Y where R is a radical selected from the group consisting of the acyclic and alicyclic alkyl radicals and Y is selected from the group consisting of an unsubstituted alkyl radical, a haloakyl radical, a —CH$_2$—O— alkyl radical, a

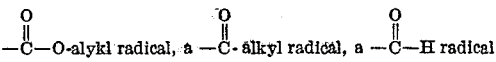

and a dihalophosphorus radical, said alkyl radicals having between 1 and 12 carbon atoms per radical, to produce an organic phosphonyl halide as a product of the process and the aforesaid difficultly distillable solid residue as a by-product of the process.

2. The process of claim 1 in which said solid residue is chlorinated with phosphorus pentachloride as the halogenating agent.

3. The process of claim 1 in which said residue is fluorinated with cobalt trifluoride as the halogenating agent.

4. The process of claim 1 in which said residue is chlorinated with sulfuryl chloride as the halogenating agent.

5. The process of claim 1 in which said residue is brominated with sulfuryl bromide as the halogenating agent.

6. The process of claim 1 in which said residue is chlorinated with thionyl chloride as the halogenating agent.

7. A process for the production of methane phosphonyl dichloride which comprises chlorination with a chloride of an oxide of sulfur, of a difficultly distillable solid residue obtained as a by-product in the reaction between phosphorus trichloride and dimethyl formal to produce methane phosphonyl dichloride as the product of the process and the aforesaid difficultly distillable solid residue as a by-product of the process.

8. The process of claim 7 in which said chlorination is effected at a temperature between about 150° C. and about 300° C.

9. A process for the production of methane phosphonyl dichloride which comprises chlorinating with thionyl chloride a difficultly distillable solid residue obtained as a by-product in the reaction between phosphorus trichloride and dimethyl formal to produce methane phosphonyl dichloride as the product of the process and the aforesaid difficultly distillable solid residue as a by-product of the process.

10. A process for the production of methane phosphonyl dichloride which comprises chlorinating with phosphorus pentachloride a difficultly distillable solid residue obtained as a by-product in the reaction between phosphorus trichloride and dimethyl formal to produce methane phosphonyl dichloride as the product of the process and the aforesaid difficultly distillable solid residue as a by-product of the process.

11. A process which comprises halogenation with a halogenating agent selected from the group consisting of a phosphorus pentahalide, a halide of an oxide of sulfur, antimony pentachloride, antimony pentafluoride and cobalt trifluoride, of a difficultly distillable solid residue obtained as a by-product in the reaction between a phosphorus trihalide and a compound having the formula R—O—Y where R is a radical selected from the group consisting of the substituted acyclic and alicyclic alkyl radicals having at least one substituent selected from the group consisting of the halo, nitro, cyano, aryl and sulfone groups, and Y is selected from the group consisting of an unsubstituted alkyl radical, a haloalkyl radical, a —CH$_2$—O=alkyl radical, a

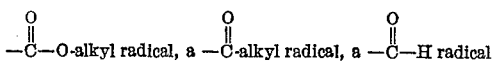

and a dihalophosphorus radical, said alkyl radicals having between 1 and 12 carbon atoms per radical, to produce an organic phosphonyl halide having the general formula

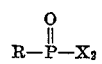

where R is the same organic radical (R) of the RO—Y reactant and X is a halogen, as a product of the process and the aforesaid difficultly distillable solid residue as a by-product of the process.

12. A process which comprises halogenation with a halogenating agent selected from the group consisting of a phosphorus pentahalide, a halide of an oxide of sulfur, antimony pentachloride, antimony pentafluoride and cobalt trifluoride, at a temperature between about 20° C. and about 350° C. of a difficultly distillable solid residue obtained as a by-product in the reaction between a phosphorus trihalide and a compound having the formula alkyl-O—CH$_2$—O-alkyl wherein said alkyl radicals have between 1 and 12 carbon atoms per radical, to produce an organic phosphonyl dihalide as a product of the process and the aforesaid difficultly distillable solid residue as a by-product of the process.

References Cited in the file of this patent

UNITED STATES PATENTS

| | | |
|---|---|---|
| 2,252,675 | Prutton et al. | Aug. 12, 1941 |
| 2,276,492 | Jolly et al. | Mar. 17, 1942 |
| 2,500,022 | Brown | Mar. 7, 1950 |
| 2,683,168 | Jensen | July 6, 1954 |

UNITED STATES PATENT OFFICE
CERTIFICATE OF CORRECTION

April 14, 1959

Patent No. 2,882,310

John W. Copenhaver et al.

It is hereby certified that error appears in the printed specification of the above numbered patent requiring correction and that the said Letters Patent should read as corrected below.

Column 1, line 51, for "methan" read -- methane --; column 8, line 30, for "23.3 grams" read -- 23.83 grams --; column 8, line 65, claim 1, and column 10, line 10, claim 11, for "--CH₂--O--", each occurrence, read -- -CH₂-O- --.

Signed and sealed this 20th day of October 1959.

(SEAL)
Attest:

KARL H. AXLINE
Attesting Officer

ROBERT C. WATSON
Commissioner of Patents